Figure 1:
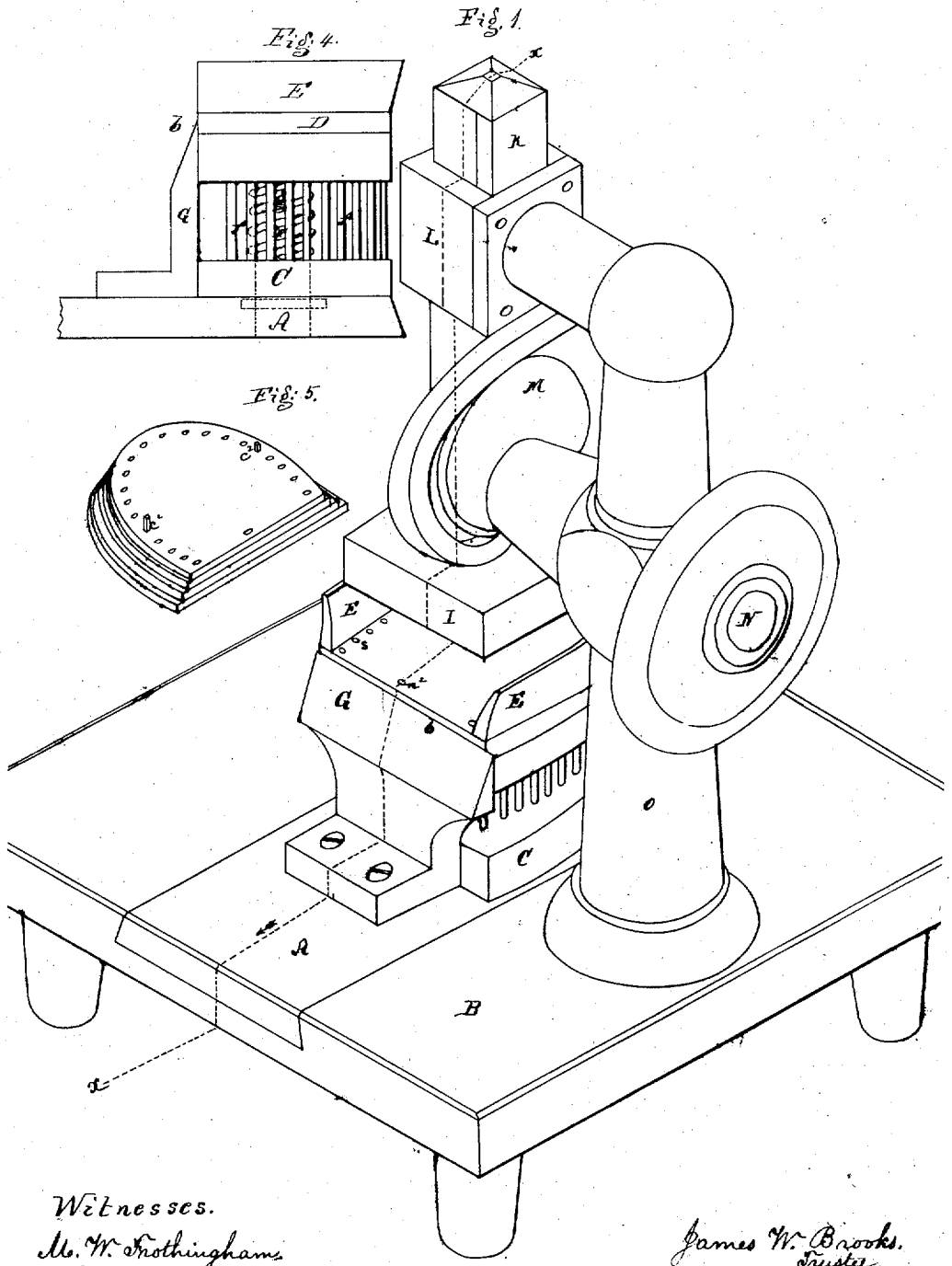

2 Sheets--Sheet 1.

G. W. ELLIS.

Machines for Punching the Lifts of Boots and Shoes.

No. 5,539. Reissued August 19, 1873.

Witnesses.
M. W. Frothingham
L. H. Latimer

James W. Brooks,
Trustee.
By his Attys.
Crosby & Gould

2 Sheets--Sheet 2.

G. W. ELLIS.

Machines for Punching the Lifts of Boots and Shoes.

No. 5,539. Reissued August 19, 1873.

Witnesses.
M. W. Frothingham.
L. H. Latimer.

James W. Brooks,
Trustee,
By his Attys.
Crosby & Foulk

UNITED STATES PATENT OFFICE.

GEORGE W. ELLIS, OF LYNN, MASSACHUSETTS, ASSIGNOR, BY MESNE ASSIGNMENTS, TO JAMES W. BROOKS, TRUSTEE.

IMPROVEMENT IN MACHINES FOR PUNCHING THE LIFTS OF BOOTS AND SHOES.

Specification forming part of Letters Patent No. 41,037, dated December 22, 1863; reissue No. 5,024, dated August 6, 1872; reissue No. 5,539, dated August 19, 1873; application filed August 11, 1873.

*To all whom it may concern:*

Be it known that I, GEORGE W. ELLIS, of Lynn, in the county of Essex and State of Massachusetts, have invented an Improved Machine for Punching the Lifts of Boot-Heels and temporarily securing them together, of which the following is a specification:

This invention relates to the manufacture of boot and shoe heels, and has particular reference to securing together properly-arranged heel-lifts, and punching in or through such assembled lifts the holes for receiving the nails by which the heel is to be secured to the sole of a boot or shoe, and also to imparting to the heel-blank means of registering or accurately determining its position in a subsequent machine for attaching the heel-blank to the sole of a boot or shoe, and to be used either with or without a knife or cutter so guided as to cut in a plane or path equidistant from the line of nails or nail-holes. The invention consists primarily in punching through a heel-blank or an assemblage of heel-lifts the nail-receiving holes, and in furnishing or forming such blank or assemblage of lifts with an index or register, which shall be an accurate guide for the driving mechanism of a subsequent attaching-machine, or for a trimming knife or cutter required to travel in a path having a fixed relation to the position of the nail-holes. The invention further consists in the employment of a guide for placing the heel-lifts, and in the combination therewith, or with a clamp that grasps or holds the heel lifts or blank, of a straight cutter for trimming the front face or breast of the heel. The invention also consists in combining, with the mechanism for punching the nail-holes in the heel-blank or assembled lifts, a mechanism for partially inserting nails through said lifts to temporarily fasten them together, so that they form a blank exactly adjusted to a machine for fastening it to a boot or shoe, or for edge-trimming it upon the boot or shoe; and in a heel-blank made up of lifts temporarily secured together, preferably provided with holes to receive the nails by which the blank is to be secured to a boot or shoe; and having a register or index to guide the driving mechanism employed to fasten the heel to the sole, and, where the same is employed, to determine the path of movement of an edge-trimming cutter relatively to the nail-holes.

In carrying out the invention, the lifts are preferably first cut out by dies of such relative sizes and shapes that, when properly assembled, they will have a form approximating to that which they are ultimately to have in the heel, the assembled lifts, suitably arranged with respect to each other, being placed upon a bed, and, by means of a follower which is brought down upon them, being forced down upon the awls and punched, while at the same time two or more tacks or headless nails may be driven sufficiently far into them to hold the lifts temporarily together, which nails may be allowed to project sufficiently far from the heel-blank to serve as the guides for placing it in a machine by which the driving of the nails is subsequently performed or the edge of the blank trimmed.

The drawing represents a machine embodying the invention.

Figure 2:
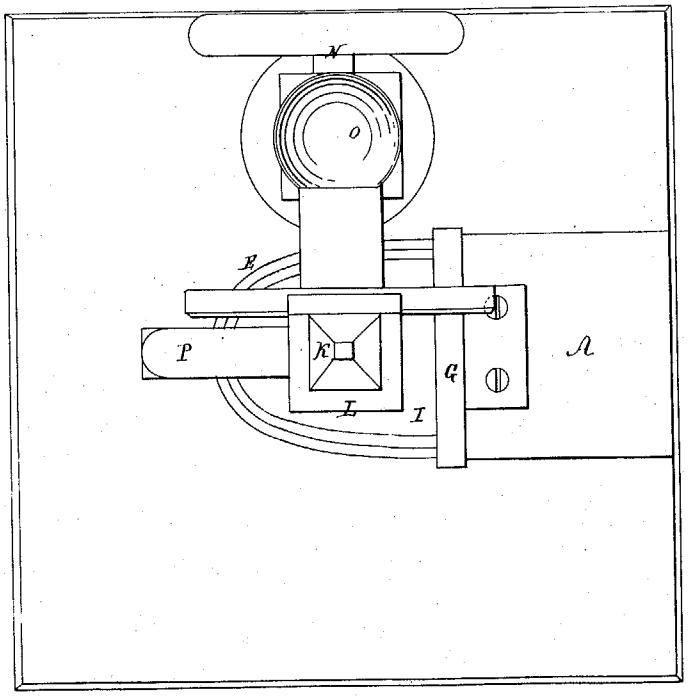
Figure 3:
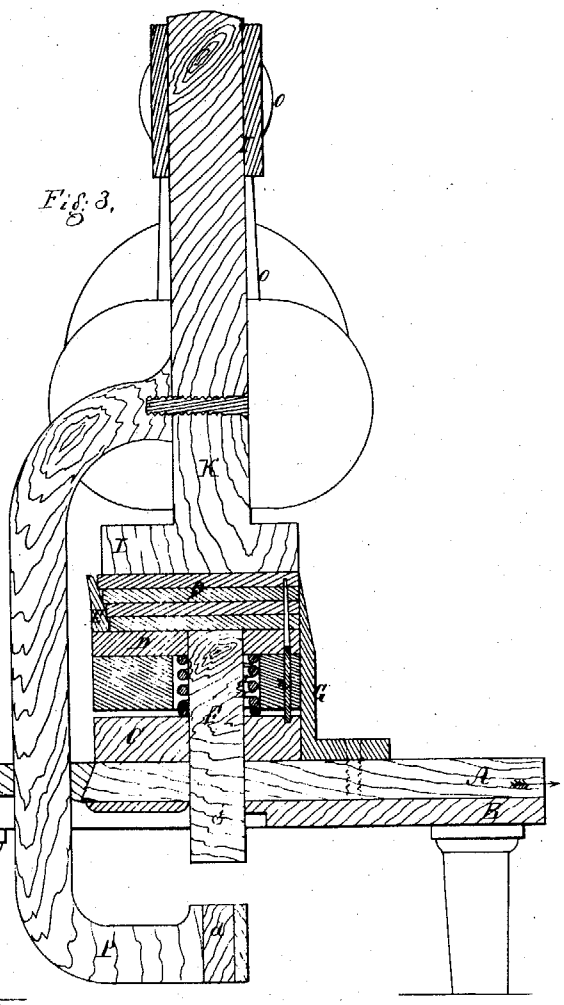

Figure 1 is a perspective view of the machine. Fig. 2 is a plan of the same. Fig. 3 is a vertical section on the line *x x* of Fig. 1; Figs. 4 and 5, details to be referred to.

In the drawing, A denotes a sliding table, running upon or between ways or guides on a bench, B, so that it may be drawn out from beneath the plunger for the purpose of inserting the work. C denotes the awl-block secured to this table, from which rise the awls *f*, which are to pierce the heel and make the holes for the nails. Above the block C is a bed, D, which is perforated with holes *s* to permit the passage of the awls through it, and upon it the lifts which are to form the heels are placed, the smallest lift at the bottom and the largest at the top. The bed D may be provided with a flaring rim, E, by which the lifts can be arranged with respect to each other as they are placed upon the bed, and from the bed a pin, F, projects down, said pin being encompassed by a spiral spring, *g*, the upper end of which bears against the under side of the bed, while the lower end rests upon the block C, in which the awls ar secured. The pin F is passed down through a hole in the block C, and is allowed a motion up and down to a certain extent, being limited in its upward motion by a pin, *i*, which is allowed to move in slots up through the bench B and table A, but brings up against the bottom of the block C. In Fig. 1 the bed D is shown as thrown by the spring *g* into its highest position, the pin *i* bearing against the under side of the block C, and when in this position the bottom of the pin F is above the bench B, and the table A may be withdrawn. G denotes a stationary knife secured to the table A, the edge *b* of which is on a level with the top of the bed D. I denotes a plunger attached to a rod, K, that slides in a guide, L, said plunger being moved up and down by the eccentric M upon a driving-shaft, N, which is operated by suitable power. In the machine, as represented in the drawing, the guide L and shaft N are mounted upon the standard O rising from the bench B; but any other suitable arrangement of these and the other parts embodying the invention may be adopted. Attached to the rear of the rod K is shown a bent arm, P, which moves up and down with the rod, and is formed at its lower end as seen at *d*.

In operating the machine, the table A is drawn out in the direction of the arrow, Fig. 1, so as to bring the bed D from beneath the plunger I, and the lifts Q, Fig. 3, are then placed upon the bed D, the smallest at the bottom, the next size above it, and so on, the flare of the rim E being such as to enable the lifts to be "placed" without requiring time or attention on the part of the operator for the purpose. The table A is then pushed back so as to bring the leather lifts beneath the plunger I. The shaft N is then turned, forcing the plunger I down upon the lifts, so that, as it continues to descend, it brings the bed D into the position seen in Fig. 3. While this is taking place the forward part of the heel is carried down past the edge of the knife G, by which it is shaved smooth, and the awls *f* are forced into and through the leather lifts, there being depressions in the under side of the follower I, to permit the awls to pass entirely through the heel. To raise the bed D and strip the punched lifts from the awl, the arm P, with its projection *d*, may be employed. As the shaft is turned and the rod K rises, the lower portion *d* of the arm P strikes the lower end of the pin F and raises it, and thereby forces the heel-blank up from the awl. By this operation the heel is shaved upon its forward edge, and the holes for the nails are made; but it is requisite at the same time to secure the lifts temporarily together, and to form an index mark or guide, by which it may be properly presented to a machine for driving the nails to secure the heel, or a machine for trimming the heel-edge to a shoe. This may be effected in the following manner: Two or more of the awls *f* are replaced by short drivers, one of which is seen at *n*, Fig. 3, which plays in the hole $n^2$ of Fig. 1. Into the holes of the bed D, corresponding to these drivers, are dropped nails of a sufficient length to penetrate the lifts and to project about one-eighth of an inch, or thereabout, above the top lift. One of these nails, *c*, is seen driven in Fig. 3, it having been dropped, point uppermost, in the hole $n^2$ before the lifts were placed upon the bed, the driver *n* being then so low that the point of the nail is below the upper surface of the bed D.

In the machine by which the heels are applied to the shoes, the edge of the heel may be shaved by a knife which passes around its edge; and to avoid the danger of the nails *c* interfering with the shaving-knife the drivers *n* may be inclined inward, so as to slant the nails inward, or away from the edge.

Fig. 5 represents a heel-blank, the holes for the nails being made and the lifts secured together temporarily by the nails $c^2$, which project about one-eighth of an inch from the upper lift, and thus serve as a guide by which the blank may be placed in the next machine, where the nails are driven and the heel shaved.

With some work the sole may be temporarily secured to the heel-blank at the same time that the latter is punched and tacked together, the rear part of the sole, or that portion covered by the heel, being then secured to the shoe by the nails, which are afterward driven to secure the heel to the sole, a portion of them passing through the upper leather and inner sole, and clinching upon an iron-plated last.

The invention may also be used for preparing heel-blanks that are to be afterward secured to the boot from the inside, in which case the awl-holes will not be required; but as the heels are to be subsequently shaved by machinery, the index or guide will be required, and the lifts must be secured together.

I claim—

1. In combination with mechanism for securing heel-lifts together, or for punching in assembled heel-lifts nail-receiving holes, mechanism for forming upon the heel-blank a gage guide or index for determining the position of the blank in a machine for driving the nails or trimming the curved edge of the heel.

2. A heel-blank having a gage register or guide for positioning the blank in a heel nailing or trimming machine, substantially as described.

3. In a machine for uniting or punching an assemblage of heel-lifts, a guide or a flange, E, for placing the lifts, substantially as shown and described.

4. Awls or punches operating to form the nail-holes, when acting in unison with drivers for inserting the nails to unite the lifts, substantially as described.

5. In combination with mechanism, substantially as described, for punching in assembled heel-lifts nail-receiving holes, a receptacle for receiving the assembled lifts, which acts to determine the position of said lifts in relation to each other.

6. In combination with mechanism, substantially as described, for punching in assembled heel-lifts nail-receiving holes, a receptacle for receiving said lifts, which acts to determine their position in relation to the punching mechanism.

7. In a machine for pricking boot and shoe heels, the combination of a tapering receptacle to contain the assembled lifts and a set of awls or punches operating through a series of holes in the plate that forms the smaller end of the receptacle, so as to prick the heel from the bottom thereof toward the top.

8. In combination with a guide for placing the heel or blank, a cutter, G, for cutting the breast or front of the heel, substantially as described.

JAMES W. BROOKS,
*Trustee.*

Witnesses:
J. C. BATES SMITH,
HENRY M. ESSELEN.